June 4, 1929.  A. C. PAYNE  1,715,381
METHOD OF MAKING PROJECTION SCREENS
Filed Feb. 4, 1926
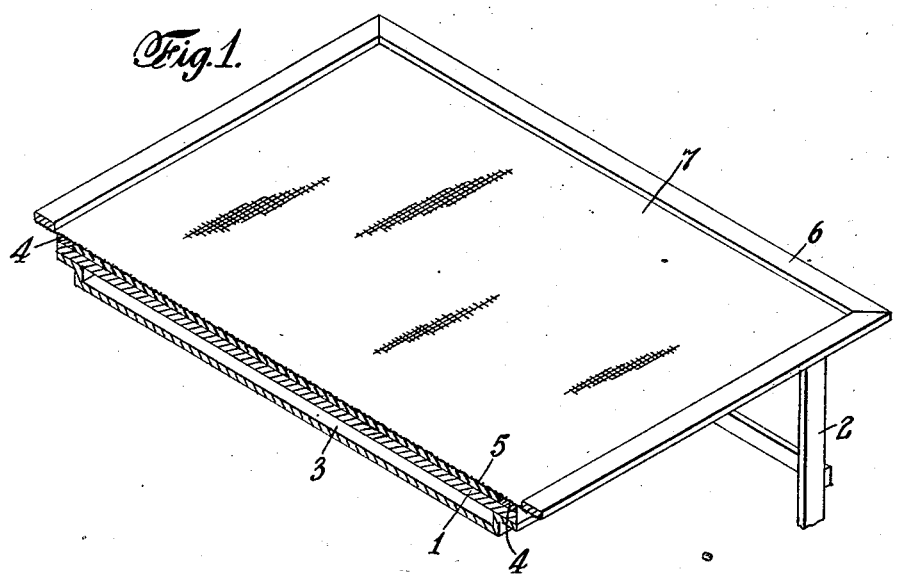
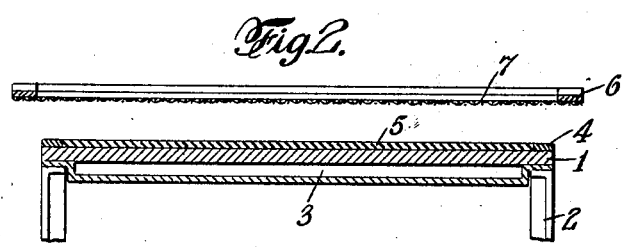
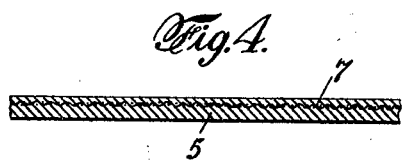
INVENTOR
BY
ATTORNEY Patented June 4, 1929.

1,715,381

UNITED STATES PATENT OFFICE.

ARTHUR C. PAYNE, OF KEW GARDENS, NEW YORK, ASSIGNOR TO TRANS-LUX DAYLIGHT PICTURE SCREEN CORPORATION, OF NEW YORK, N. Y., A CORPORATION OF DELAWARE.

METHOD OF MAKING PROJECTION SCREENS.

Application filed February 4, 1926. Serial No. 85,862.

This invention relates to a novel and improved method of forming a projection screen and more particularly a screen which is translucent. According to my invention the screen is formed of two parts and has the characteristics described and claimed in my copending application Serial No. 739,892, filed September 25, 1924. The method forming the subject matter of the present application deals with the uniting of the parts forming the screen.

This application is a continuation in part of my copending application Serial No. 739,893, filed September 25, 1924.

In the accompanying drawings in which I have illustrated the steps followed in the practice of my invention:

Figure 1 is a perspective view, partly in section, showing the table upon which the screen is supported during its manufacture.

Figure 2 is a view showing a transverse section through the table of Figure 1 and showing the frame with sheet stretched thereon in position about the table.

Figure 3 is a sectional view of a portion of the screen before the sheet is embedded in the plastic material.

Figure 4 is a view corresponding to Figure 3 but showing the finished product.

Referring now to the drawings in detail the numeral 1 designates a molding top or plate supported as by table legs 2 and having disposed beneath it a receptacle 3 in which may be installed any suitable heating mechanism, whereby the plate 1 may be heated. The plate 1 may be made of any suitable material, preferably a metal, which will give the required surface. The edges of the plate are supplied with retaining strips or guides 4 which serve to hold on the plate the molded material 5. This material is preferably the same as that disclosed in the patent to Troeger No. 1,151,502, issued August 24, 1915. This material is a gelatinous one which may be readily molded and which has the requisite properties of translucency and flexibility together with the other characteristics desirable in a screen of this nature. While I prefer to use the material disclosed in the aforesaid patent, I do not intend to limit myself thereto, as any moldable substance which is otherwise suitable may be employed.

The finished screen has embedded therein a sheet of light diffusing material preferably in the form of a fabric. Difficulty has been experienced in embedding a sheet of fabric in a body of plastic material, and that difficulty has been overcome by my method. It is desirable to form the body of plastic material in a mold independently of the fabric, so that the body may be free of bubbles or other imperfections. Therefore, it is best to cause the fabric to be incorporated in the body after the body has been formed. It is extremely difficult to do this with ordinary fabrics. I have found, however, that, if a fabric and more particularly the kind of fabric exemplified by georgette crepe which is silk is treated by the process known as "boiling off" to remove the gums or resinous materials therein, the fabric may then be incorporated or embedded in the body of plastic material according to my invention and with excellent results.

The fabric which, as I have pointed out above, is preferably a silk crepe of crinkly form, is treated to remove the gums and resins and is then secured to a frame 6 which serves to stretch the same and to remove wrinkles and creases therefrom. The stretched sheet 7 is then laid upon the molded material in the mold formed by the plate 1 and guides 4. This material has previously been deposited upon the plate by known methods. In order to obtain the best results it is preferable to brush the material on to the plate at first until a continuous film is formed after which pouring may be resorted to. This procedure prevents the formation of bubbles of air or other gas. After the material has been deposited upon the plate, it is smoothed off with a straight edge so as to give a slab of material having a smooth surface. The stretched fabric is then applied to this surface as stated above.

I have discovered that, when a fabric and more particularly one treated in the manner set forth above is laid upon the plastic material, the material which of course is kept soft as by heating draws the fabric down into it. Capillary action also takes place and the plastic material works up through the fabric. The result is that the fabric sheet is completely embedded in the body of plastic material.

The action is illustrated in Figures 3 and 4. In Figure 3 the sheet 7 is shown as stretched upon the body 5, while in Figure 4 the fabric is shown after it has been drawn down into the plastic material and become incorporated therein.

From the above it will be apparent that I have provided a novel and improved method of making a projection screen. By the use of my method the necessity of employing expensive machinery is avoided. The heated table top or plate and the frame are the only pieces of apparatus required. In stretching the fabric sheet care should be taken to stretch it sufficiently to remove all creases and wrinkles therein but at the same time it should not be stretched to such an extent as to impart a stress into the body of the plastic material. This stress could be borne by the body when it is hard but under adverse atmospheric conditions the material of the body may soften and thus permit the stretched fabric to yield, thus deforming the screen. My method is one which has proven very successful in actual practice, and it makes possible the manufacture of a screen which is very difficult, if not impossible to make otherwise.

In Figure 4 the fabric sheet is shown as completely embedded in the body of plastic material. According to my method the degree to which the sheet is embedded may be as great as shown in Figure 4 or even greater according to the amount which is desired. For practical purposes, however, and to form the best projection screen it is desirable that the amount of embedding should not be as great as the exaggerated showing in Figure 4. It is, however, essential that the fabric should be completely covered by the plastic material, but for best results it should not be so deeply embedded as to make possible the forming of a shiny surface of plastic material on top thereof. The fabric, if completely covered but left sufficiently near the surface of the plastic material, effectively prevents this shiny surface and thus insures the desired light diffusing effect.

I am, of course, aware that various changes may be made in practicing my method without departing from the scope of my invention, and I do not intend to limit myself except as by the appended claims.

I claim:

1. The method of making a projection screen which comprises forming a body of plastic material, laying a sheet of fabric upon the plastic material, and permitting the sheet to become incorporated therein independent of any applied pressure.

2. The method of making a projection screen which comprises forming a body of plastic material, laying a sheet of fabric upon the plastic material, and permitting the sheet to become incorporated therein by capillary action.

3. The method of making a projection screen which comprises forming a body of plastic material, applying heat to said body, laying a sheet of fabric upon the plastic material, and permitting the sheet to become incorporated therein independent of any applied pressure.

4. The method of making a projection screen which comprises forming a body of plastic material, applying heat to said body, laying a sheet of fabric upon the plastic material, and permitting the sheet to become incorporated therein by capilliary action.

5. The method of making a projection screen which comprises forming a body of plastic material, stretching a fabric sheet, laying the stretched sheet upon the plastic material, maintaining the plastic material soft, and permitting the sheet to become incorporated in the plastic material independent of any applied pressure.

6. The method of making a projection screen which comprises forming a body of plastic material, stretching a fabric sheet, laying the stretched sheet upon the plastic material, maintaining the plastic material soft, and permitting the sheet to become incorporated in the plastic material by capillary action.

7. The method of making a projection screen which comprises removing the gum or resinous material from a sheet of fabric, laying the sheet upon a body of plastic material, and permitting the sheet to become incorporated therein.

8. The method of making a projection screen which comprises removing the gum or resinous material from a sheet of fabric, laying the sheet upon a body of plastic material, and permitting the sheet to become incorporated therein by capillary action.

9. The method of making a projection screen which comprises forming a body of plastic material, removing the gum or resinous material from a sheet of fabric, stretching said sheet, laying the stretched sheet upon a plastic material, and permitting the sheet to become incorporated therein while maintaining the material soft.

10. The method of making a projection screen which comprises forming a body of plastic material, removing the gum or resinous material from a sheet of fabric, stretching said sheet, laying the stretched sheet upon the plastic material, and permitting the sheet to become incorporated therein while maintaining the material soft, said incorporation taking place by capillary action.

11. The method of making a projection screen which comprises removing the gum or resinous material from a sheet of silk, laying the sheet of silk upon a body of plastic material and permitting the sheet to become incorporated therein by capillary action.

12. The method of making a projection screen which comprises forming a body of gelatinous plastic material, removing the gum or resinous material from a sheet of georgette crepe, stretching said sheet, laying the stretched sheet upon the plastic gelatinous material and permitting the sheet to become incorporated therein, while maintaining the material soft, said incorporation taking place by capilliary action.

In testimony whereof, I have affixed my signature to this specification.

ARTHUR C. PAYNE.

CERTIFICATE OF CORRECTION.

Patent No. 1,715,381.  Granted June 4, 1929, to

ARTHUR C. PAYNE.

It is hereby certified that error appears in the printed specification of the above numbered patent requiring correction as follows: Page 1, line 24, for the word "about" read "above"; and that the said Letters Patent should be read with this correction therein that the same may conform to the record of the case in the Patent Office.

Signed and sealed this 2nd day of July, A. D. 1929.

(Seal)

M. J. Moore,
Acting Commissioner of Patents.